(12) United States Patent
Morinaga

(10) Patent No.: US 6,463,221 B2
(45) Date of Patent: Oct. 8, 2002

(54) BATTERY ACCOMMODATING DEVICE

(75) Inventor: Kenichi Morinaga, Osaka (JP)

(73) Assignee: Funai Electric, Co., Ltd., Daito (JP)

( * ) Notice: Subject to any disclaimer, the term of this patent is extended or adjusted under 35 U.S.C. 154(b) by 0 days.

(21) Appl. No.: 09/760,756

(22) Filed: Jan. 17, 2001

(65) Prior Publication Data

US 2001/0008584 A1 Jul. 19, 2001

(30) Foreign Application Priority Data

Jan. 17, 2000 (JP) .................................. 2000-000117 U

(51) Int. Cl.⁷ ................................................ G03B 1/00
(52) U.S. Cl. ................................. 396/539; 396/536
(58) Field of Search ..................... 396/539, 536; 429/97, 99

(56) References Cited

U.S. PATENT DOCUMENTS

| | | | |
|---|---|---|---|
| 4,371,594 A | * 2/1983 | Ohara et al. | 429/97 |
| 5,248,569 A | * 9/1993 | Pine et al. | 429/100 |
| 5,372,395 A | * 12/1994 | Yang | 292/147 |
| 5,508,124 A | * 4/1996 | Gordecki et al. | 429/100 |
| 5,678,110 A | * 10/1997 | Koiwai | 396/535 |
| 5,848,719 A | * 12/1998 | Goldenberg | 220/281 |

FOREIGN PATENT DOCUMENTS

| | | |
|---|---|---|
| JP | 53-89530 | 12/1951 |
| JP | 55-40977 | 9/1953 |
| JP | 8-255604 | 10/1996 |
| JP | 8-328096 | 12/1996 |
| JP | 9-251330 | 9/1997 |

* cited by examiner

Primary Examiner—Russell Adams
Assistant Examiner—D. Ben Esplin
(74) Attorney, Agent, or Firm—Crowell & Moring LLP

(57) ABSTRACT

In a battery accommodating device, a lock member 11 is disposed on a lid 5 which is pivotally supported by a case 1 and a protrusion 22 formed on an arm piece 28 of the lock member 11 is to be engaged with an engaging portion 27 of the case 1, and a second protrusion 23 is disposed on the arm piece 28. When a shock is applied to the device or the device drops, the engagement between the protrusion 22 and the engaging portion 27 may be canceled and the lid 5 may be opened. Even in this situation, the protrusion 23 is engaged with the engaging portion 27, and hence the lid 5 rests in a state where the lid is opened by a certain angle.

5 Claims, 4 Drawing Sheets

BATTERY ACCOMMODATING DEVICE

BACKGROUND OF THE INVENTION

1. Field of the Invention

The present invention relates to a battery accommodating device for a digital camera or the like, and more particularly to a locking structure for a lid which closes and opens a battery accommodating portion.

2. Description of the Related Art

A portable apparatus such as a digital camera usually includes: a case which accommodates a battery; a lid which is pivotally attached to the case to close and open a battery accommodating portion; and an elastic lock member which is disposed on the lid. The lock member is engaged with an engaging portion of the case to close the battery accommodating portion by the lid. A battery accommodating device having such a locking structure is disclosed in, for example, JP-B-63-48941U and JP-B-3-6620.

In such a conventional device, in a situation such as that a shock is applied to the case, that the case drops, or that the user accidentally touches the lock member, the engagement between the lock member and the case may be canceled so that the lid is opened and the battery inside the case jumps out. When the battery jumps out, there arises a fear that the battery drops on the foot of the user or an article to cause an injury or a damage.

SUMMARY OF THE INVENTION

It is an object of the invention to provide a battery accommodating device which can solve the above-discussed problem, and in which, even when application of a shock, dropping of the device, or the like occurs, a battery is prevented from jumping out, so that safety can be ensured.

In order to solve the problem, according to the invention, a first protrusion which is to be engaged with an engaging portion of a case in a state where a lid closes a battery accommodating portion, and a second protrusion which is to be engaged with the engaging portion of the case when the lid is pivoted to open the battery accommodating portion are disposed on a lock member.

In this structure, in a usual state, the first protrusion is engaged with the engaging portion of the case to hold the lid at a locked state. When application of a shock, dropping of the device, or the like occurs, the engagement between the first protrusion and the case may be canceled and the lid may be opened. Even in this situation, the second protrusion is engaged with the engaging portion of the case, and hence the lid rests in a state where the lid is opened by a certain angle. Therefore, an opening of the accommodating portion is opened only to an intermediate position, whereby the battery can be prevented from jumping out to drop.

In the invention, the lock member may be configured by a U-like arm member in which one end is a fixed end and another end is a free end, and the first and second protrusions may be disposed on an arm piece on a side of the free end. According to this configuration, the lock member is provided with a sufficient elastic force so that the locking can be surely attained. In this configuration, preferably, an arm piece on a side of the fixed end is configured by a pair of arm pieces which are dividedly formed to be respectively on both sides of a groove, in order to easily cancel the engagement of the second protrusion.

In the invention, the second protrusion may be a protrusion having an arcuate curved face. According to this configuration, an operation of canceling the engagement of the second protrusion is further facilitated.

In the invention, the lock member which is structured as described above may be molded integrally with the lid. According to this configuration, the lock member is not required to be formed as a separate member, and the double locking mechanism can be realized by only the lid.

DETAILED DESCRIPTION OF THE PREFERRED EMBODIMENTS

Figure 1:
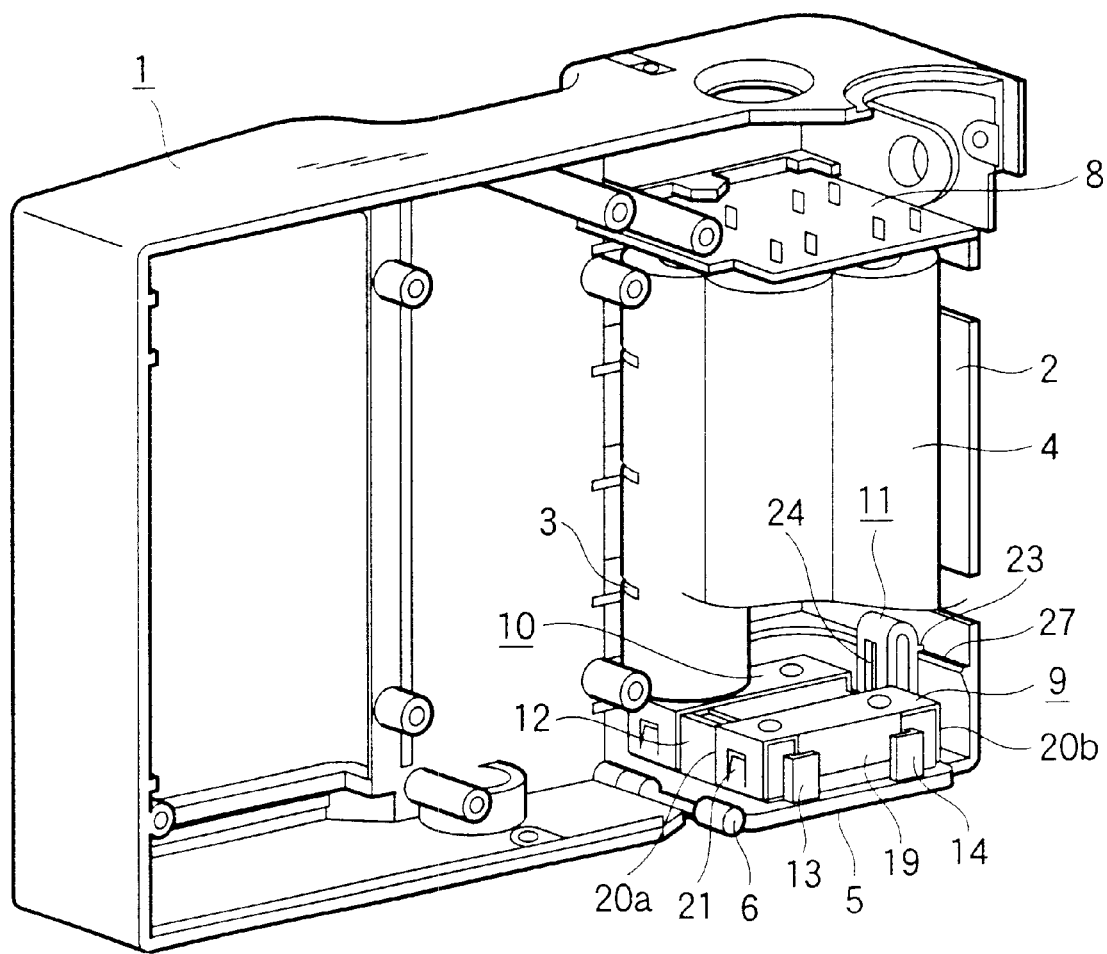
FIG. 1 is a perspective view showing an example of the battery accommodating device of the invention.

Hereinafter, an embodiment of the invention will be described with reference to the figures. FIG. 1 is a perspective view showing an example of the battery accommodating device of the invention, or an embodiment in which the invention is applied to a digital camera. In the figure, 1 denotes a case of the digital camera, 2 denotes a battery accommodating portion which is disposed inside the case 1, 3 denotes a battery holding portion which is formed integrally on the inner wall of the battery accommodating portion 2, 4 denotes a battery which is accommodated in the battery accommodating portion 2, 5 denotes a lid which is pivotally attached to a lower portion of the case 1 so as to close and open a lower opening of the battery accommodating portion 2, 6 denotes a support shaft through which the lid 5 is pivotally supported on the case 1, 8 denotes a terminal board which is disposed above the battery accommodating portion 2, and in which battery terminals (not shown) are disposed on the rear side, 9 and 10 denote a pair of battery terminals which are disposed on the rear side of the lid 5, and 11 denotes a lock member which is disposed on the lid 5.

Figure 2:
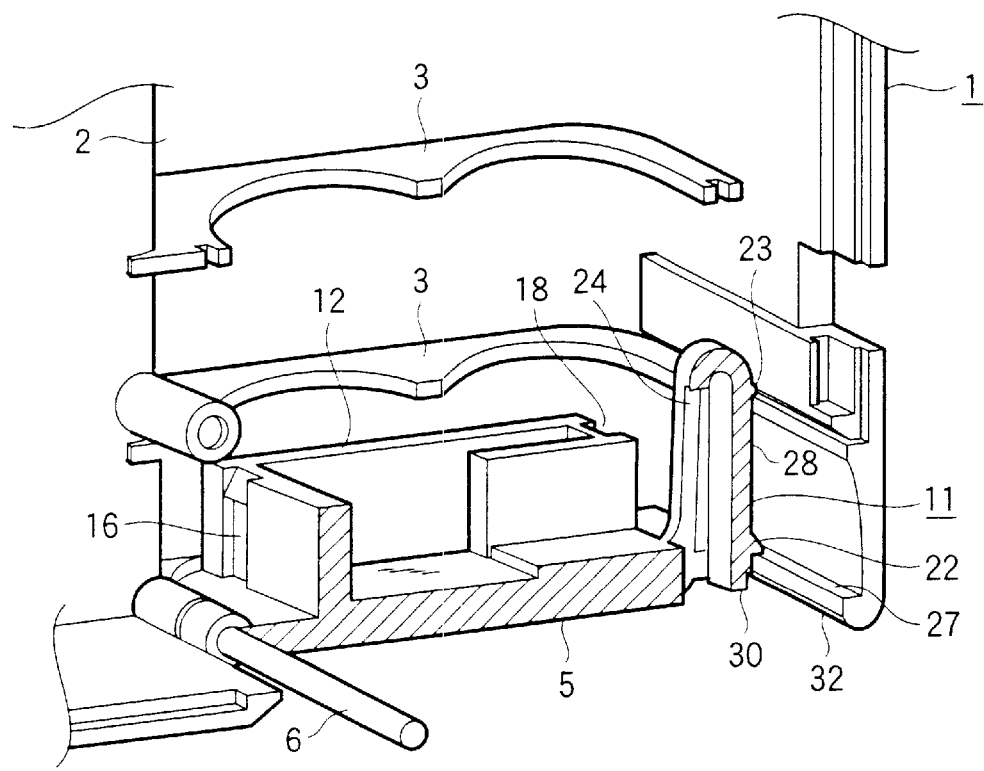
FIG. 2 is a perspective view of main portions in a state where a lid is locked.
Figure 3:
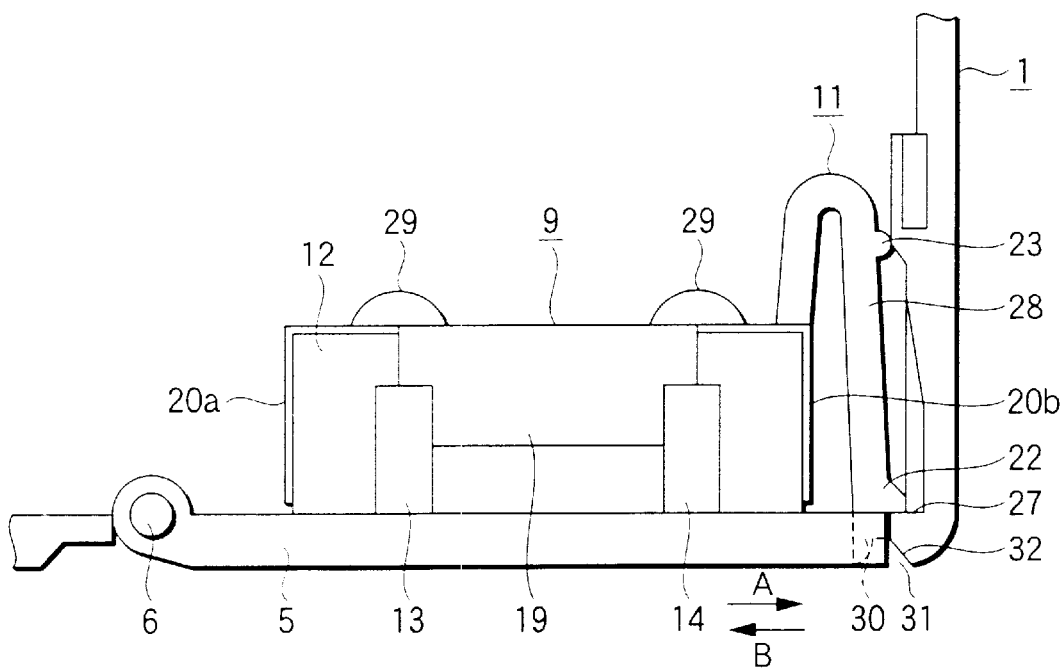
FIG. 3 is a front view showing the state.
Figure 6:
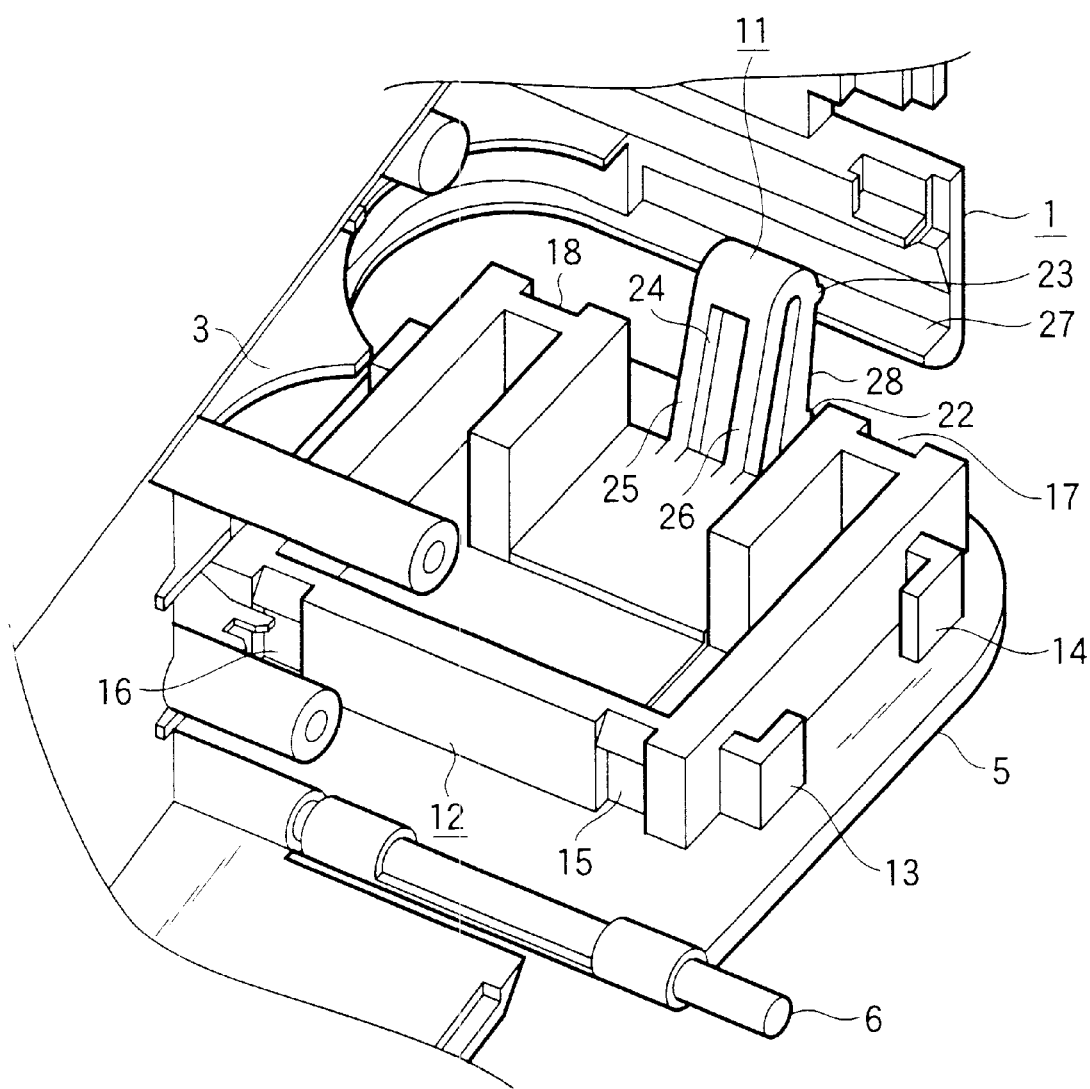
FIG. 6 is a perspective view of the whole of the main portions.

FIG. 2 is a perspective view of main portions in a state where the battery terminals 9 and 10 are removed away. In the figure, the lid 5 and the lock member 11 are shown in a section form in the case where the lid 5 is cut in a center portion. FIG. 3 is a front view of the main portions. In FIGS. 2 and 3, the battery 4 is not shown. A wall 12 is molded by a resin integrally with the rear side of the lid 5. The battery terminals 9 and 10 are supported by the wall 12. As shown FIG. 1, the wall 12 has L-like support pieces 13 and 14 on a side portion, and, as shown in FIG. 6, grooves 15 to 18 are formed in the wall.

As shown FIG. 1, the battery terminal 9 has a side piece 19 and a pair of bent pieces 20a and 20b. An engaging piece 21 is formed in the bent piece 20a. Although not shown, a similar engaging piece is formed also in the bent piece 20b. The engaging piece 21 is engaged with the groove 15 of the wall 12, the engaging piece which is not shown is engaged with the groove 17 of the wall 12, and the side piece 19 is fitted between the support pieces 13 and 14 of the wall 12, whereby the battery terminal 9 is lockingly fixed to the wall 12 as shown in FIG. 1. Although detailed description is omitted, the battery terminal 10 also is fixed to the wall 12 by a structure similar to that for the battery terminal 9. Referring to FIGS. 3, 29 denotes projections of the battery terminals against which the electrodes of the battery 4 are to abut.

The lock member 11 is configured by a U-like arm member which is molded by a resin integrally with the lid 5, and in which one end is a fixed end and another end is a free end. A protrusion 22 (first protrusion) is disposed in a lower portion of a first arm piece 28 which is on the side of the free end, and another protrusion 23 (second protrusion) is disposed in an upper portion. A hook 30 with which a finger is to be engaged when the locking of the lid 5 is to be canceled is formed in a tip end portion of the first arm piece 28. The portion of the U-like arm member on the side of the fixed end is configured by a pair of second arm pieces 25 and 26 (see FIG. 6) which are dividedly formed to be respectively on both the sides of a groove 24. As shown in FIG. 3, the protrusion 22 is formed into a trapezoidal shape so as to, in a closed state of the lid 5, be engaged with a step 27 disposed on the inner wall of the case 1. The step 27 constitutes the engaging portion in the invention. On the other hand, the protrusion 23 is a protrusion having an arcuate curved face of a semicircular shape or the like. The protrusions 22 and 23 are formed at positions on concentric circles centered at the support shaft 6 of the lid 5.

Figure 4:
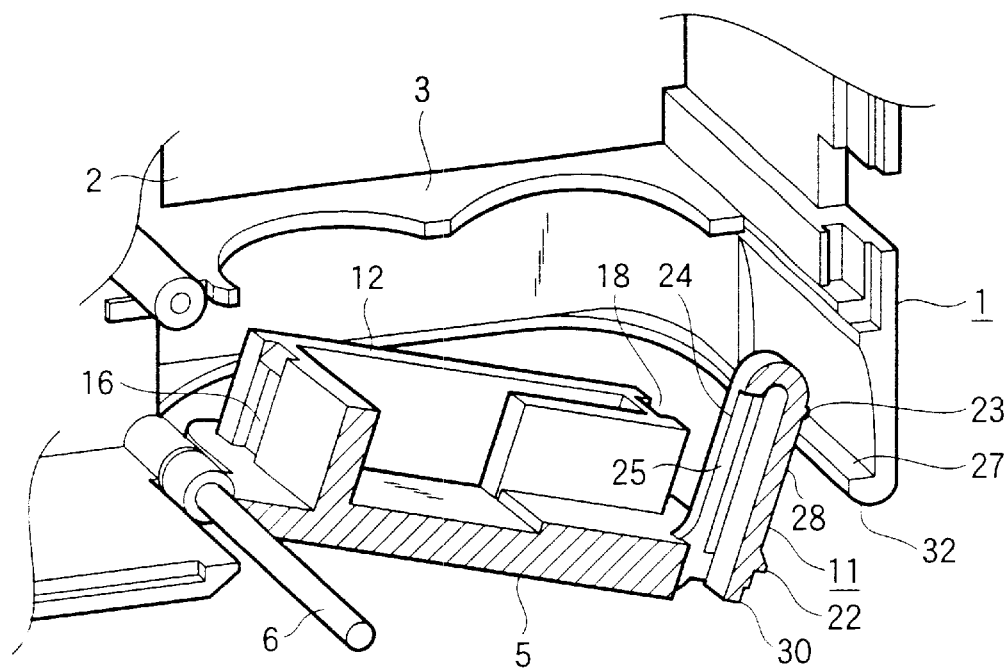
FIG. 4 is a perspective view of main portions in a state where the lid is partly opened.
Figure 5:
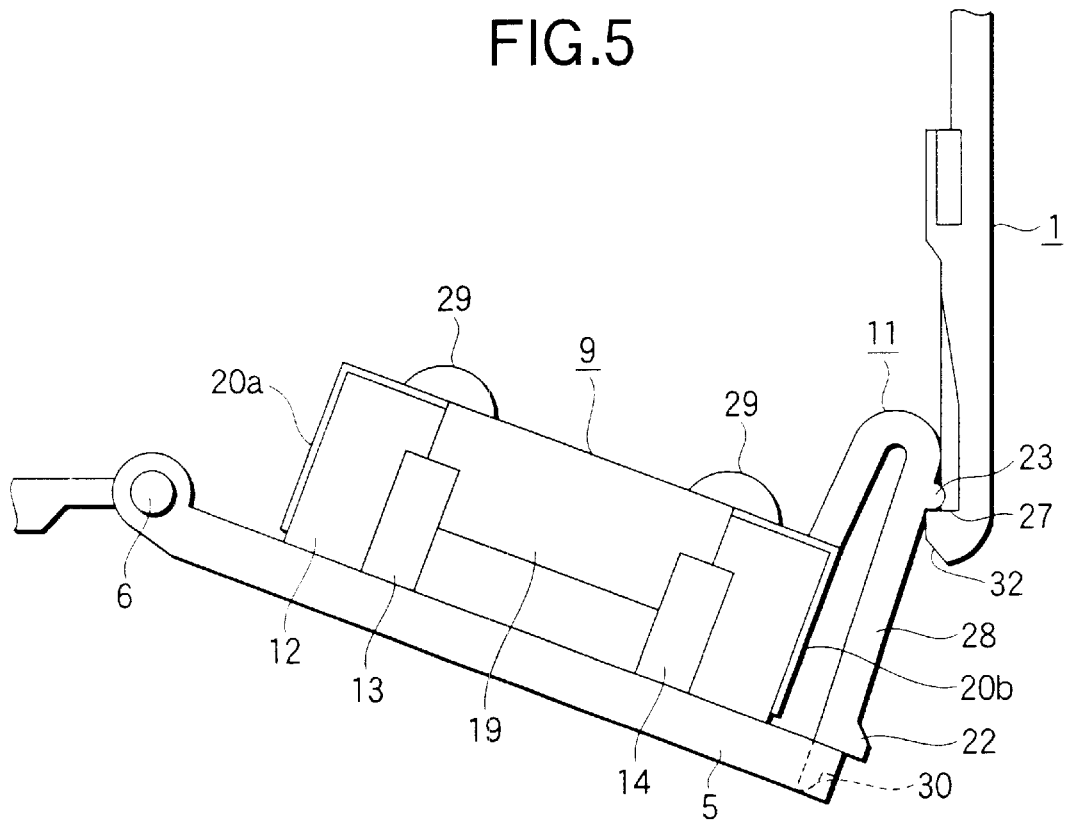
FIG. 5 is a front view showing the state.

In the above configuration, the lock member 11 is made of a resin material and formed into a U-like shape, and hence has sufficient elasticity. The protrusion 22 is engaged with the step 27 of the case 1 by the elastic force acting in the direction of the arrow A in FIG. 3. When a strong external force is applied to the case 1 as a result of dropping of the device or application of a shock, or when a force accidentally acts on the hook 30 of the lock member 11, the engagement between the protrusion 22 and the step 27 is canceled, and the lid 5 is pivoted about the support shaft 6 in a clockwise direction in FIG. 3, to try to open the battery accommodating portion 2. When the lid 5 is pivoted by a predetermined degree, however, the protrusion 23 abuts against the step 27 to be engaged therewith as shown in FIGS. 4 to 6, and hence the lid 5 is not further pivoted and rests in a state where the lid 5 is opened by a certain angle. Therefore, the battery 4 (not shown in FIGS. 4 to 6) accommodated in the battery accommodating portion 2 does not accidentally jump out to the outside, whereby the battery can be prevented from dropping.

The lid 5 which has been once opened to an intermediate position can be again closed and then locked in the following manner. The lid 5 is pivoted in a counterclockwise direction in FIG. 5, and the protrusion 22 is pushed along a lower end tapered portion 32 of the lower end of the case 1 while the arm piece 28 is elastically deformed, until the protrusion is engaged with the step 27. Then, the first arm piece 28 is restored by the self-elastic force to return to the locked state shown in FIG. 3. At this time, since the protrusion 22 has a trapezoidal shape, its upper face is formed as a tapered face, and the tapered portion 32 is formed in the lower end of the case 1, the pushing operation can be smoothly performed.

By contrast, when the lid 5 is to be opened in order to attach or detach the battery 4 during a normal use, the following operations are performed. First, a fingertip is inserted into a recess 31 (see FIG. 3) formed by the case 1 and the lid 5 to be engaged with the hook 30 of the lock member 11, and the hook 30 is moved in the direction of the arrow B in FIG. 3 against the elastic force of the lock member 11. This causes the engagement between the protrusion 22 and the step 27 to be canceled, so that the lid 5 can be freely pivoted. When the lid 5 is opened by a certain angle, the protrusion 23 is engaged with the step 27, and, when the lid 5 is thereafter strongly pulled, the lock member 11 is displaced so as to fall in a rearward direction (toward the support shaft 6), whereby the engagement between the protrusion 23 and the step 27 is forcedly canceled. As a result, the lid 5 can be completely opened.

In the above-mentioned operation steps, when the engagement between the protrusion 22 and the step 27 is to be canceled in the first step (FIG. 3), the first arm piece 28 is elastically deformed with using the top of the lock member 11 as a fulcrum. By contrast, when the engagement between the protrusion 23 and the step 27 is to be canceled in the second step (FIG. 5), the second arm pieces 25 and 26 are elastically deformed with using the lower fixed end (basal portion) of the lock member 11 as a fulcrum. Since the groove 24 is formed between the second arm pieces 25 and 26, the second arm pieces 25 and 26 are more elastic than the first arm piece 28, so that, when the lid 5 is pulled in a state where the protrusion 23 is engaged with the step 27, the second arm pieces 25 and 26 are easily elastically deformed and the whole of the lock member 11 is rearward displaced. Therefore, the cancellation of the engagement between the protrusion 23 and the step 27 can be performed without hindrance. Since the protrusion 23 is formed into an arcuate shape, the operation of canceling the engagement can be performed more smoothly.

In order to close the lid 5 to attain the locked state, the lid 5 is pivoted in a counterclockwise direction, the protrusion 23 is pushed along the lower end tapered portion 32 of the case 1, and the protrusion 22 is thereafter pushed until the protrusion 22 is engaged with the step 27. Then, the first arm piece 28 is restored by the self-elastic force to return to the locked state shown in FIGS. 1 to 3. At this time, since the protrusion 23 has an arcuate curved shape, the protrusion 23 can be easily pushed along the tapered portion 32.

The lock member 11 may be configured by a lock lever and a spring as a component which is separate from the lid 5. In this configuration, the number of parts and assembling steps are increased and the production cost is raised. Therefore, the lock member 11 is preferably formed integrally with the lid 5 as described above.

Although a digital camera has been described as an example in the embodiment, the invention may be applied also to a camera of a kind other than a digital camera. Alternatively, the invention may be applied to a small audio apparatus such as an MD player in place of a camera.

As was described above, according to the invention, even when the engagement of the first protrusion 22 is canceled by a shock, dropping, or the like, the second protrusion 23 is engaged with the case and the case is not opened at an angle larger than a predetermined one. Therefore, the battery 4 is prevented from jumping out to drop, so that safety can be ensured.

What is claimed is:

1. A battery accommodating device comprising:
  a case which accommodates a battery;
  a lid which is pivotally attached to said case to close and open a battery accommodating portion; and
  an elastic lock member which is disposed on said lid, said lock member being engaged with an engaging portion of said case to close said battery accommodating portion by said lid;
  wherein said lock member has: a first protrusion which is to be engaged with said engaging portion of said case in a state where said lid closes said battery accommodating portion; and a second protrusion which is to be engaged with said engaging portion of said case when said lid is pivoted to open said battery accommodating portion.

2. A battery accommodating device according to claim 1, wherein said lock member is configured by a U-like arm member in which one end is a fixed end and another end is a free end, and said first and second protrusions are disposed on a first arm piece on a side of said free end.

3. A battery accommodating device according to claim 2, wherein a portion of the U-like arm member on a side of said fixed end is configured by a pair of second arm pieces which are dividedly formed to be respectively on both sides of a groove.

4. A battery accommodating device according to claim 1, wherein said second protrusion is a protrusion having an arcuate curved face.

5. A battery accommodating device according to claim 1, wherein said lock member and said lid are integrally molded.

* * * * *